Dec. 12, 1967     E. REBOSIO     3,358,076

PROTECTED ROD INSULATOR

Filed Dec. 27, 1965

Inventor:—
Edgardo Rebosio,
Webb, Burden, Robinson By   Webb,
Attorneys.

United States Patent Office 3,358,076
Patented Dec. 12, 1967

3,358,076
PROTECTED ROD INSULATOR
Edgardo Rebosio, Milan, Italy, assignor to British Insulated Callender's Cables Limited, London, England, a British company
Filed Dec. 27, 1965, Ser. No. 516,340
Claims priority, application Italy, Dec. 24, 1964, 54,801
2 Claims. (Cl. 174—179)

This invention relates to electric insulators of the kind comprising a rod, which may be of solid or hollow cross-section, of resin bonded glass fibre, which term is used hereafter in this specification and the claims forming part thereof to include other high tensile inorganic fibres. By a rod of resin bonded glass fibre we means a rod of a thermosetting or cold-setting synthetic resin, of a kind which sets to a hard, infusible and insoluble condition, with or without heat, reinforced with rovings of glass fibres or with glass fibres which are distributed throughout the mass of the rod and which, in the case of a rod of solid cross-section, lie substantially parallel to one another throughout the length of the rod and preferably substantially all of which are of the same or approximately the same length as the rod. In the case of rods of hollow cross-section, it is preferable for some at least of the glass fibres to extend circumferentially or helically of the rod.

Electric insulators of the kind above described are light, possess exceptionally good tensile strength and are mechanically robust and shock proof. Such rod insulators are pre-eminently suitable as tension insulators and, where the rods are of hollow cross-section, are also suitable where the mechanical loading is one of longitudinal compression.

The lightness and strength of resin bonded glass fibre insulators and their apparently excellent electrical characteristics would seem to make them the ideal insulator for use in overhead transmission lines and in the overhead equipment of electric traction systems of the kind in which current is taken from an overhead contact wire. However when such insulators are subjected to electrical stress under outdoor conditions tracking occurs after a relatively short period of service leading to total decomposition of the insulators. By "tracking" is meant the formation on the surface of the insulator of thread-like tracks of carbon formed by breakdown of the bonding resin of the resin bonded glass fibre insulator due to the occurrence of electrical discharges across the insulator. The stress required to initiate tracking varies according to the particular bonding resin used in the manufacture of the resin bonded glass fibre insulator and it also varies according to the weather and the degree of atmospheric pollution, wet or icy conditions tending to cause earlier initiation of tracking.

It has previously been proposed in the specification of our British Patent No. 915,052 to eliminate tracking on the surface of a resin bonded glass fibre rod insulator by use of a closely fitting longitudinally continuous covering of an elastomeric polymeric insulating material. Examples of suitable insulating materials given in our aforesaid specification are neoprene, butyl rubber and silicone rubber compositions, polytetrafluoroethylene and other fluorocarbon polymers or copolymers. The anti-tracking performances of the elastomeric synthetic rubbers are preferably improved by compounding them with a special filler or special fillers, for example hydrated alumina, mica flour and hydrated silica.

Among the above-mentioned relatively nontracking materials polytetrafluoroethylene is particularly suitable owing to its capacity of resisting high temperatures, to its physico-chemical stability and above all because carbon tracks are not formed due to the occurrence of electrical discharges, but only surface erosions are caused.

As it is now required to use resin bonded glass fibre insulators at operating voltages greater than that at which they have hitherto been used the problem arises as to how the leakage path between the terminal fittings of the insulator is to be increased to a value to satisfy the safety requirements for these higher voltages without increasing the overall length of the insulator itself.

It is an object of the present invention to provide an improved electric insulator having a protective covering which provides a solution to this problem.

According to the invention our electric insulator comprises a rod of resin bonded glass fibre having, over the whole or a major part of its length, a protective covering built up of a plurality of axially aligned short sleeves of relatively nontracking elastomeric polymeric material, each of which sleeves is flared at one end, the flared end of each of the sleeves overlying and being connected to the unflared end of an adjacent sleeve. Preferably the flared end of each of some or all of the sleeves runs into an integral outwardly extending flange.

Each sleeve is preferably internally screw threaded over at least a part of its flared end and is externally screw threaded at its other end, so that the flared end of one sleeve overlies and is in screw threaded engagement with the externally screw threaded end of an adjacent sleeve. The taper of the internally screw threaded part of the flared end of each sleeve is preferably such that, as the flared end of a sleeve is screwed onto the externally screw threaded end of an adjacent sleeve, the externally screw threaded end is caused to grip, and make a seal fit with, the resin bonded glass fibre rod. Instead of the neighboring ends of adjacent sleeves being in screw threaded engagement the ends may be cemented together by a suitable adhesive, for example a cold setting resin composition. Where the neighboring ends of adjacent sleeves are in screw threaded engagement, the screw threaded connection may be, and preferably is, supplemented by an adhesive which also serves as a seal to the ingress of moisture.

The sleeves are preferably a seal fit upon the resin bonded glass fibre rod but where the insulator will in service be subjected to any high electrical stress we prefer to coat the rod with insulating material, for instance with an insulating grease or putty, prior to application of the sleeves with a view to filling any clearance between the rod and the sleeves.

The invention will now be described in more detail and by way of example, with reference to the accompanying drawing, in which.

Figure 1:
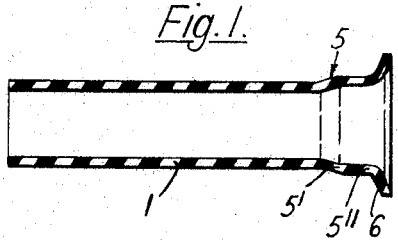
FIGURES 1 and 2 are longitudinal sectional views of alternative forms of short sleeve for use in forming a protective covering of a resin bonded glass fibre rod insulator.

The short sleeve 1 shown in FIGURE 1, which is of polytetrafluoroethylene, is of uniform cross-section over the greater part of its length but at one end the cross-section of the sleeve increases to form a flaring 5 which runs into an integral outwardly extending flange 6, the whole flaring having the appearance of the bell of a trumpet. The flaring 5 is preferably in two parts, a first part 5' having a relatively steep taper and a second longer part 5" having only a slight taper. Adjacent sleeves of a protective covering built up of a plurality of sleeves 1 would be connected in axial alignment by inserting the unflared end of one sleeve into the flared end of an adjacent sleeve and cementing it thereto by means of a suitable adhesive.

Figure 2:
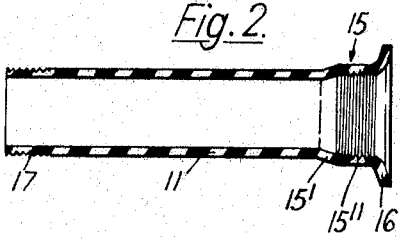

The short sleeve 11 shown in FIGURE 2 is of the same material and shape as the sleeve shown in FIGURE 1 but differs in that its unflared end is provided with an external screw thread 17 of very fine pitch and the slightly tapered part 15" of its flared end 15 is provided with an internal screw thread of the same pitch as that of the threaded end 17.

Figure 3:
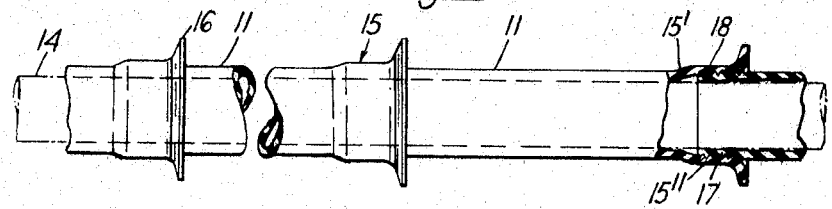
FIGURE 3 is a fragmental view partly in section and partly in elevation of a rod insulator having a protective covering built up of a plurality of axially aligned short sleeves.

The insulator of which a portion is shown in FIGURE 3 comprises a resin bonded glass fibre rod 14 of which a part between its terminal fittings (not shown) is enclosed in a protective covering built up of a plurality of axially aligned short sleeves 11 of polytetrafluoroethylene. Adjacent sleeves 11 of the protective covering are connected together by inserting the externally screw threaded unflared end 17 of one sleeve into the internally screw threaded flared end 15 of an adjacent sleeve and screwing the two sleeves together. The slight taper of the threaded part 15" is such that as the flared end 15 is screwed onto the externally screw threaded end 17 of an adjacent sleeve, the externally screw threaded end is caused to grip, and make a seal fit with, the rod 14. If desired, the externally screw threaded end 17 and/or the internally screw threaded part 15" may have a suitable cold setting resin composition 18 applied thereto shortly before bringing adjacent sleeves into screw threaded engagement, the composition serving to lock the two sleeves together and to seal the screw threaded connection against the ingress of moisture.

Figure 4:
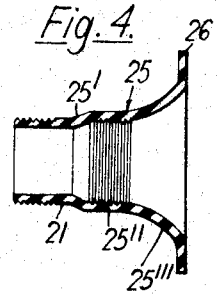
FIGURE 4 is a longitudinal sectional view of a third form of short sleeve.

The short sleeve 21 shown in FIGURE 4 is also of polytetrafluoroethylene but is less than half the length of the sleeves illustrated in FIGURES 1 and 2. The cross section of the sleeve over a major portion of its length increases as it approaches one end of the sleeve to form a flaring 25 which runs into a integral outwardly extending flange 26. The flaring 25 is in three parts, a first part 25' having a relatively steep taper, a second longer part 25" having only a slight taper and a third part 25''' having a taper which increases gradually as it approaches the flange 26. The unflared end of the sleeve has an external screw thread 27 of very fine pitch and the slightly tapered part 25" of its flaring 25 has an internal screw thread of the same pitch.

Figure 5:
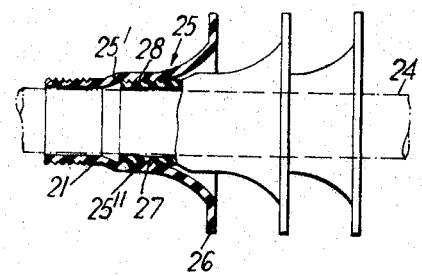
FIGURE 5 is fragmental view partly in section and partly in elevation of a rod insulator having an alternative form of protective covering built up of a plurality of short sleeves as shown in FIGURE 4.

The insulator of which a portion is shown in FIGURE 5 comprises a resin bonded glass fibre rod 24 of which a part between its terminal fittings (not shown) is enclosed in a protective covering built up of a plurality of axially aligned short sleeves 21. Adajacent sleeves 21 are connected together by screwing the externally screw threaded end 27 of each sleeve into the internally screw threaded part 25" of the flared end 25 of an adjacent sleeve. As in the insulator shown in FIGURE 3 the externally screw threaded end 27 and/or the internally screw threaded part 25" may be coated with a cold setting resin composition 28 before they are brought into screw threaded engagement.

In forming the short sleeves, flared at one end, a length of tube of a thermosetting plastics material of suitable length may be used and one end of the same heated up to an appropriate temperature. With the use of a tool of a profile corresponding to the flared end it is wished to obtain the heated end of the tube is upset on a die which may then be also heated and rotated on a mandrel so as to form an outwardly extending flange of uniform thickness. Alternatively the flared end may be formed by direct moulding of an end of a tube or by filling a suitably shaped mould with polytetrafluoroethylene powder and moulding the whole sleeve in a single operation.

What I claim as my invention:

1. An electric insulator comprising a rod of resin bonded glass fibre and, over at least a major part of the length of said rod, a protective covering built up of a plurality of axially aligned short sleeves of relatively non-tracking elastomeric polymeric material, each of which sleeves is flared at one end, said flare being internally screw threaded over a part of its length, and is externally screw threaded at its other end, the flared end of each of the sleeves overlying and being in screw threaded engagement with the externally screw threaded end of an adjacent sleeve and the internally screw threaded flare end of each sleeve having a taper of such an angle that the externally screw threaded end of the adjacent sleeve engaged thereby is caused to grip, and make a seal fit with, the rod.

2. An electric insulator as claimed in claim 1, wherein the screw threaded connection between adjacent sleeves is supplemented by an adhesive which cements together the inter-engaging screw threaded ends of the sleeves and also serves as a seal to the ingress of moisture.

References Cited

UNITED STATES PATENTS

| 1,194,957 | 8/1916 | Cochrane | 174—179 |
| 1,381,189 | 6/1921 | Haefly | 174—179 |

FOREIGN PATENTS

| 1,121,187 | 4/1956 | France. |
| 408,225 | 3/1934 | Great Britain. |
| 878,073 | 9/1961 | Great Britain. |
| 914,552 | 1/1963 | Great Britain. |
| 915,052 | 1/1963 | Great Britain. |

LARAMIE E. ASKIN, *Primary Examiner.*